(12) United States Patent
Brown et al.

(10) Patent No.: US 8,509,319 B2
(45) Date of Patent: Aug. 13, 2013

(54) UPLINK PRECODING FOR RETRANSMISSION WITHOUT EXPLICIT PRECODING INSTRUCTION

(75) Inventors: Tyler A. Brown, Mundelein, IL (US); Krishna Kamal Sayana, Arlington Heights, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 113 days.

(21) Appl. No.: 13/251,763

(22) Filed: Oct. 3, 2011

(65) Prior Publication Data

US 2012/0087424 A1  Apr. 12, 2012

Related U.S. Application Data

(60) Provisional application No. 61/390,536, filed on Oct. 6, 2010.

(51) Int. Cl.
*H04B 7/02* (2006.01)
(52) U.S. Cl.
USPC ............................ 375/257; 375/260; 455/132
(58) Field of Classification Search
USPC ........................................................ 375/267
See application file for complete search history.

(56) References Cited

U.S. PATENT DOCUMENTS

| | | | |
|---|---|---|---|
| 2003/0156572 A1 | 8/2003 | Hui et al. | |
| 2006/0107167 A1 | 5/2006 | Jeong et al. | |
| 2010/0131813 A1 | 5/2010 | Kim et al. | |
| 2010/0150036 A1* | 6/2010 | Zheng et al. | 370/281 |
| 2010/0150214 A1* | 6/2010 | Seo et al. | 375/219 |
| 2010/0208838 A1* | 8/2010 | Lee et al. | 375/267 |
| 2011/0051834 A1* | 3/2011 | Lee et al. | 375/267 |
| 2011/0119548 A1* | 5/2011 | Imamura et al. | 714/748 |
| 2011/0142147 A1* | 6/2011 | Chen et al. | 375/260 |
| 2011/0150132 A1* | 6/2011 | Kim et al. | 375/296 |
| 2011/0217971 A1* | 9/2011 | Kim et al. | 455/422.1 |
| 2011/0222615 A1* | 9/2011 | Kuo et al. | 375/260 |
| 2012/0044830 A1* | 2/2012 | Kim et al. | 370/252 |
| 2012/0063438 A1* | 3/2012 | Kang et al. | 370/338 |
| 2012/0270535 A1* | 10/2012 | Chen et al. | 455/422.1 |

OTHER PUBLICATIONS

3GPP TSG RAN WG1 #62, R1-104850 "Precoding for PHICH-triggered retransmissions" Ericsson, ST-Ericsson; Madrid, Spain; Aug. 23-27, 2010, 3 pages.
3GPP TSG RAN WG1 #62, R1-104616 "Further discussion on UL SU-MIMO precoding in PHICH-triggered retransmissions" Samsung; Madrid, Spain; Aug. 23-27, 2010, 5 pages.
3GPP TSG RAN WG1 #62, R1-104298 "Uplink re-tranmission without UL grant" Huawei; Madrid, Spain; Aug. 23-27, 2010, 5 pages.

(Continued)

*Primary Examiner* — Eva Puente
*Assistant Examiner* — Santiago Garcia

(57) ABSTRACT

A method in a wireless communication device includes receiving precoding matrix information including first and second precoding submatrices, transmitting a first transport block from a first set of at least two antennas according to the first precoding submatrix and a second transport block from a second set of at least two antennas according to the second precoding submatrix, receiving a retransmission request for the second transport block, and retransmitting the second transport block according to a retransmission precoding matrix from at least one of the first set of antennas and at least one of the second set of antennas.

11 Claims, 3 Drawing Sheets

(56) References Cited

OTHER PUBLICATIONS

3GPP TSG RAN WG1 #62, R1-104480 "Precoder Selection for Non-0Adaptive HARQ UL SU-MIMO" Texas Instruments; Madrid, Spain; Aug. 23-27, 2010, 3 pages.

3GPP TSG RAN WG1 #62bis, R1-105611 "Precoder for PHICH-Triggered SU-MIMO Re-transmissions" Motorola, Xi'An, People's Republic of China, Oct. 11-15, 2010, 10 pages.

Samsung: "UL SU-MIMO precoding in PHICH-triggered retransmissions", 3GPP Draft; RI-103035 Precoding, 3rd Generation Partnership Project (3GPP), Mobile Competence Centre , 650, Route Des Iucioies , F-06921 Sophia-Antipolis Cedex, France, vol. RAN WGI, no. Montreal, Canada; 20100510, May 4, 2010.

Patent Cooperation Treaty, International Search Report and Written Opinion of the International Searching Authority for International Application No. PCT/US2011/054851, Dec. 12, 2011, 15 pages.

\* cited by examiner

UPLINK PRECODING FOR RETRANSMISSION WITHOUT EXPLICIT PRECODING INSTRUCTION

CROSS-REFERENCE TO RELATED APPLICATIONS

The present application claims benefits under 35 U.S.C. 119(e) to U.S. Application No. 61/390,536 filed on 6 Oct. 2010, the contents of which are incorporated herein by reference.

FIELD OF THE DISCLOSURE

The present disclosure relates generally to multi-antenna precoding techniques in wireless communications and, more particularly, to the precoder used for uplink retransmissions of data after its previously unsuccessful transmission.

BACKGROUND

In wireless communication systems, data transmission from multiple antennas can be "precoded" by applying different weights on a signal to be sent from a set of transmit antennas. There can be one or more spatial "layers" of distinct data streams, up to the number of transmit antennas. The precoding operation can be represented mathematically by a precoder, or precoding matrix that includes a vector form as the special case. The precoder matrix transforms or maps the one or more data layers to the transmit antennas. Precoding transmission can happen in either downlink (i.e., from a base station to a device) or in uplink (i.e., from a device to a base station). In uplink precoding, a base station typically needs to instruct the device to use a precoding matrix selected from a set of precoding matrices known to both base station and the device, the set referred to as a codebook. Precoding can be used to obtain beamforming gain by transmitting a single spatial layer, or improve spectral efficiency using spatial multiplexing, where two or more layers are transmitted simultaneously. Further, the one or more layers may be obtained from one or more "transport blocks". A Transport Block (TB) is used to represent a block of information bits which are uniquely coded into a codeword which is mapped to the corresponding one or more spatial layers. One transport block may be mapped to one or more layers, but a layer corresponds to only one transport block.

In the case of two or more transport blocks set simultaneously using an indicated precoding matrix, sometimes not all transport blocks can be decoded successfully. In that case, the failed transport block needs to be transmitted again later (known as Hybrid ARQ or HARQ retransmission) and there may be no new transport block to be sent at the same time in place of the successful transport blocks. Since the total number of spatial layers is reduced in this case, the precoding matrix also needs to change. The HARQ retransmission may often occur based on predefined protocol without any explicit instruction of the new precoding matrix from the base station. This invention describes methods that determine the new or retransmission precoding matrix that a device can use when retransmitting the unsuccessful transport block(s), using a combination of techniques.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
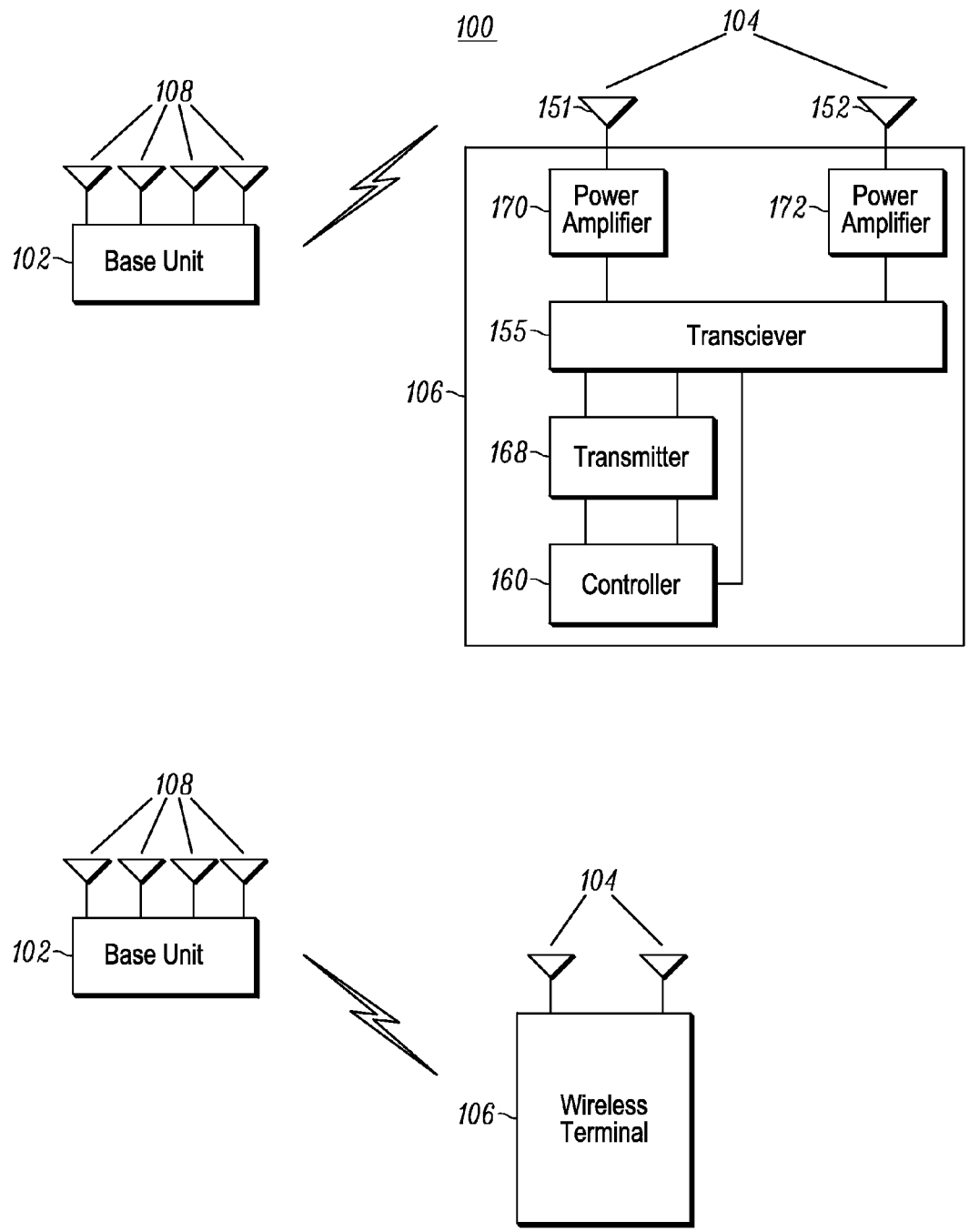
FIG. 1 illustrates a wireless communication system.

In FIG. 1, a wireless communication system 100 can comprise one or more fixed base infrastructure units 102 forming a network distributed over a geographical region for serving wireless terminals 106 in the time and/or frequency domain. A base unit 102 may also be referred to as an access point, access terminal, base, base station, Node-B, eNode-B, Home Node-B, Home eNode-B, relay node, or by other terminology used in the art. The one or more base units 106 each can include one or more antennas 108, each of which may be used for transmission of communication signals, reception of communication signals, or both transmission and reception of communication signals. The base units 102 are generally part of a radio access network that can include one or more controllers communicably coupled to one or more corresponding base units 102. The access network is generally communicably coupled to one or more core networks, which may be coupled to other networks, like the Internet and public switched telephone networks, among other networks. These and other elements of access and core networks are not illustrated but are well known generally by those having ordinary skill in the art.

In FIG. 1, the one or more base units 102 can serve a number of wireless terminals 106, within a corresponding serving area, for example, a cell or a cell sector, via a wireless communication link. The wireless terminals 106 may be fixed or mobile. The wireless terminals 106 may also be referred to as subscriber units, mobiles, mobile stations, users, terminals, subscriber stations, user equipment (UE), user terminals, wireless communication devices, or by other terminology used in the art. In FIG. 1, the base unit 102 transmits downlink communication signals to serve wireless terminal 106 in the time and/or frequency and/or spatial domain. The wireless terminal 106 communicates with base unit 102 via uplink communication signals. The wireless terminal 106 can include one or more antennas 104 each of which may be used for transmission of communication signals, reception of communication signals, or both transmission and reception of communication signals. The wireless terminals 106 may transmit in have half duplex (HD) or full duplex (FD) mode. In Half-duplex transmission and reception do not occur simultaneously whereas in full duplex transmission terminals do transmission and reception occur simultaneously. The wireless terminals 106 may communicate with the base unit 102 via a relay node.

In one implementation, the wireless communication system 100 is compliant with the 3rd Generation Partnership Project (3GPP) Universal Mobile Telecommunications System (UMTS) Long Term Evolution (LTE) protocol, also referred to as Evolved Universal Mobile Telecommunications System (UMTS) Terrestrial Radio Access (EUTRA) or Release-8 (Rel-8) 3GPP LTE or some later generation thereof, wherein the base unit 102 transmits using an orthogonal frequency division multiplexing (OFDM) modulation scheme on the downlink and the user terminals 106 transmit on the uplink using a single carrier frequency division multiple access (SC-FDMA) scheme. More generally, however, the wireless communication system 100 may implement some other open or proprietary communication protocol, for example, WiMAX, among other protocols.

According to one embodiment, the wireless terminal 106 can include a first antenna 151 and a second antenna 152. The wireless terminal 106 can include transceiver 155 coupled to the first power amplifier 170 and coupled to the second power amplifier 172. The first power amplifier 170 is coupled to the first antenna 151 and the second power amplifier 172 is coupled to the second antenna 152. While a transceiver architecture with one RF front end may be used for antenna switching, another typical architecture may have a transceiver having multiple RF front ends coupled to multiple power amplifiers and the power amplifiers being coupled to multiple antennas. The wireless terminal 106 can include a transmitter 168 coupled to the transceiver 155. The wireless terminal 106 can include a controller 160 coupled to the transceiver 155.

Conventionally a single transceiver with a single RF front end is connected to a single PA which is connected to a single antenna at a wireless terminal in uplink transmission. With multiple physical antennas at the UE, there are different multi-antenna uplink transmission modes, such as open-loop and closed-loop modes. The term transmission mode refers to a particular configuration of elements used in the transmission of a communications signal and their interaction. For example, closed-loop modes of operation refer to techniques that require the receiver to convey some information about the channel. Based on this information, the transmitter typical weights the signal to be sent on each antenna by a complex-valued coefficient so that, as an example of transmission strategies, maximal amount of signal can be directed to the receiver. This processing is referred to as precoding or beamforming. In both open- or closed-loop modes of operation, the transmitted signals from multiple antennas may correspond to a single stream of data (i.e., single-layer or rank-1) or multiple streams of data (i.e., multi-layer or rank-x).

Figure 2:
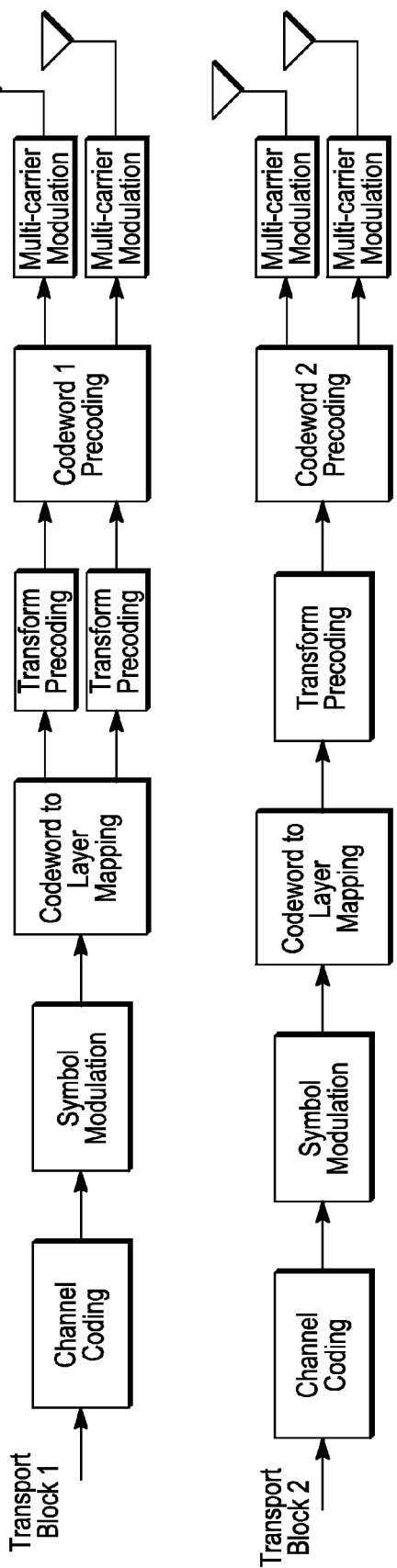
FIG. 2 illustrates an embodiment of a mobile station capable of multi-stream transmission to the base station on the uplink.

FIG. 2 shows a mobile station that may be equipped with multiple uplink transmit antennas which allows it to send one or more spatial streams based on a precoding matrix. Each spatial stream, also referred to as a layer, is associated with a block of information bits called a transport block. In 3GPP LTE specification, a maximum of two transport blocks are allowed. As one example of the uplink precoding transmission, the mobile station's antennas are divided into two subsets, one for each of the transport blocks. The transport blocks are channel coded, for example with a convolutional, block, or turbo code, and the resulting block of channel coded bits, referred to as a codeword, are mapped to a block of modulation symbols. The symbol modulation may be for example QPSK, 8PSK, 16QAM, or 64QAM. The channel coding and modulation operations may be different for different transport blocks. An optional step of scrambling the channel coded bits in order to make the sequence of modulation symbols approximate a white sequence is not shown. The block of modulation symbols are distributed to one or more layers by the codeword to layer mapping function. For the case of one transport block mapping to one layer, the codeword to layer mapping is straightforward. For the case of a single transport block mapping to two layers, even modulation symbols may be mapped to one layer and odd symbols to the other layer. But any mapping that maps its length-N input to one of two length-N/2 outputs is possible. The modulation symbols are then transform coded resulting in blocks of layer symbols. Transform coding may consist of the discrete Fourier transform (DFT) in LTE. The layer symbols corresponding to each TB are precoded and the resulting precoded symbols are multi-carrier modulated and the multi-carrier modulated symbols are mapped to the antennas of the transport block's antenna set. Multi-carrier modulation, i.e., modulating each layer symbol onto each OFDM (Orthogonal Frequency Division Multiplexing) subcarrier, may be performed for example by the inverse discrete Fourier transform (IDFT), appended cyclic prefix, followed by digital to analog conversion and filtering. The precoding operation will now be described in more detail.

In typical precoded multi-antenna transmission, a number of transmission layers (also referred to as spatial streams) are precoded onto the transmit antennas, which can be represented as.

$$X = Vs$$

where X is the Nt-by-1 vector of transmitted values on Nt antennas, V is the Nt-by-L precoding matrix, s is the L-by-1 vector of symbols, L being the number of layers and Nt being the number of transmit antennas.

In LTE uplink multi-antenna transmission, the precoders are designed such that the spatial layers associated with individual transport blocks are transmitted from different subsets of transmit antennas. So, as an example, when two transport blocks are sent from 4 antennas, the one or more spatial layers associated with TB1 are transmitted from the antennas 1 and 2, and the one or more spatial layers associated with TB2 is transmitted from antennas 3 and 4. Clearly, this corresponds to the case where the precoder V has a block diagonal structure, represented by $$V = \begin{bmatrix} P_1 & 0 \\ 0 & P_2 \end{bmatrix}.$$

The precoding operation for each $TB_i$, i=1, 2 consists of forming $M_i$ amplitude-weighted and phase-shifted sums of the complex-valued symbols on its $L_i$ layers. Here $L_i$ is the number of layers associated with transport block i and $M_i$ is the number of antennas used for transmitting $TB_i$. In FIG. 2 the first transport block has two layers and the second transport block has one layer, i.e. $L_1=2$, $L_2=1$. Both transport blocks have two antennas in their subsets, i.e., $M_1=2$ and $M_2=2$. Mathematically, the above precoding operation may be represented as the matrix-vector multiplication of a $M_i \times L_i$ sub-matrix $P_i$ (corresponding submatrix within the precoding matrix) and an $L_i \times 1$ vector of layer symbols $s_i$, resulting in the $M_i \times 1$ vector of transmitted values, $x_i$, i.e., $$x_i = P_i s_i, i=1,2.$$

The overall precoding operation may be then expressed as, assuming two transport blocks, each corresponding to $L_i$ spatial layers, $$\begin{bmatrix} x_1 \\ x_2 \end{bmatrix} = \begin{bmatrix} P_1 & 0 \\ 0 & P_2 \end{bmatrix} \begin{bmatrix} s_1 \\ s_2 \end{bmatrix}$$

Note that in the case of a single TB transmission, the precoding matrix may not be block diagonal. The invention pertains to the case when a first transmission from the mobile has the block diagonal structure, which is when each transport block is transmitted from non-overlapping subsets of antennas.

The choice of the precoding matrix influences the link performance, i.e. the likelihood of successful decoding of the one transport blocks at the base station. In a typical system operation, a base station selects the precoder matrix from a predefined precoder codebook, which is known to both the mobile and the base station. The selection is based on a certain criterion, such as to maximizing the rate of transmission that can be supported with a certain probability of error. Once selected, an index of the corresponding precoder matrix (known as the precoding matrix indicator or PMI) in the codebook is indicated to the mobile station in a control message. The mobile station then using such precoding matrix in the subsequent transmission to the base station on the uplink.

Figure 3:
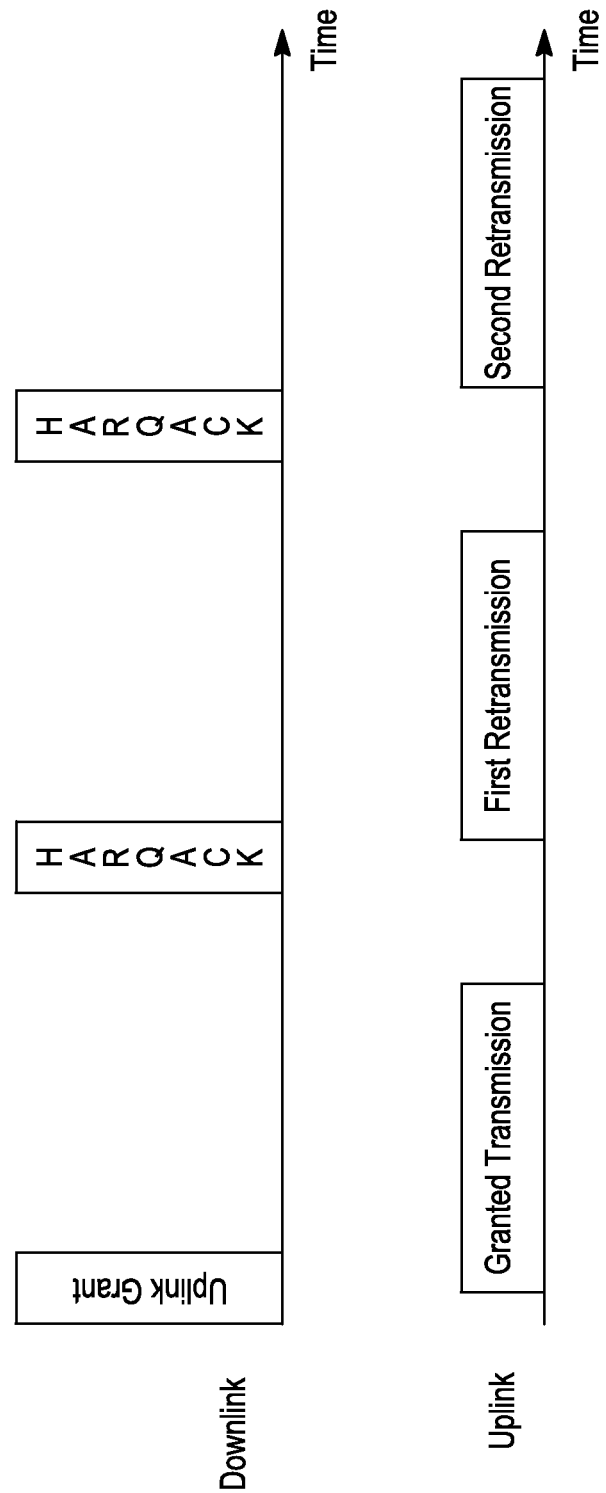
FIG. 3 illustrates control channel messages and uplink data transmission.

A timing diagram illustrating uplink multi-antenna transmission and the associated control message is shown in FIG. 3. The transmission process for a set of two transport blocks begins with an uplink grant sent on a downlink control channel. The mobile station decodes this message and recovers parameters for use in a subsequent granted data transmission. A granted data transmission is a transmission slot in the uplink for the mobile station, which is also described with an associated time and frequency location information, such as subframes and resource blocks etc. These recovered parameters may specifically include the number of information bits for each transport block size, referred to a the transport block size (TBS), the subcarriers on which to transmit, the modulation order to use, e.g. QPSK, 16QAM, or 64QAM, an indication of the coded bits to be sent in the grant transmission, termed the redundancy version, an indication of whether the transport blocks to be transmitted are new transport blocks or have been transmitted previously in a granted transmission, a hybrid ARQ stream number indicating which HARQ process to use for the transmission, and most relevant for the invention, the indication of which precoding matrix, with associated submatrices $P_1$ and $P_2$ to use for TB one and two respectively. The precoding sub-matrices are implicitly indicated as part of the precoder matrix index.

The mobile station then transmits the transport blocks as in FIG. 2 according to the parameters decoded in the control message. The transmission is received by the base station receiver and attempts to decode both transport blocks are made. The base station then transmits a control message, termed the Hybrid ARQ ACK Indication (HARQ-ACK) on the downlink, to the mobile station. The HARQ-ACK contains information on whether the two transport blocks were successfully decoded. For example the HARQ-ACK message could consist of two bits corresponding to the two transport blocks. A bit value of '0' indicates that the transport block should be retransmitted during a predetermined time period, while and indication of '1' indicates not to perform a retransmission in this period. The mobile station receives the HARQ-ACK message and if the message indicates that one of the transport blocks should be retransmitted, it retransmits the associated transport block according to a set of parameters known by both the base station receiver and the mobile station. Some of the original parameters may be reused in a retransmission, e.g. the subcarrier allocation, the modulation order, etc. Other parameters, for example the precoding to be used for the retransmission can not be reused, if the total number of layers to be transmitted is reduced, which is the case when there is no new TB to be sent (to take the place of successful TB) with the retransmitted TB at the same time.

The invention is about a method for a wireless communication device to re-transmit a data transport block to a base station, in particular about the precoding in the retransmission. The method comprising of receiving information of a precoding matrix from a base station wherein the precoding matrix comprises of a first precoding submatrix and a second precoding submatrix, transmitting a first data transport block from a first set of at least two antennas according to the first precoding submatrix and a second data transport block from a second set of at least two antennas according to the second precoding submatrix, receiving from the base station information on the retransmission request of one of the first transport block and the second transport block, and retransmitting the second data transport block according to a retransmission precoding matrix from at least one of the first set of antennas and at least one of the second set of antennas, when the received information indicates the retransmission request of the second transport block.

In a preferred embodiment, we assume the precoding submatrices used for the granted first transmission as, for the first precoding submatrix $$P_1 = \begin{bmatrix} 1 \\ x \end{bmatrix}$$

where x is a complex scalar, for example a member of the set,
$\{1,-1,j,-j\}$,
and for the second precoding submatrix $$P_2 = \begin{bmatrix} 1 & 0 \\ 0 & 1 \end{bmatrix}.$$

In other words, the precoding matrix of the original transmission, as instructed by the base station is $$P = \begin{bmatrix} P_1 & 0 \\ 0 & P_2 \end{bmatrix} = \begin{bmatrix} 1 & 0 & 0 \\ x & 0 & 0 \\ 0 & 1 & 0 \\ 0 & 0 & 1 \end{bmatrix}$$

which is block diagonal, with one column in the first precoding submatrix and two columns in the second precoding submatrix in this example. The corresponding data model is:

$$x = \begin{bmatrix} x_1 \\ x_2 \end{bmatrix} = P \begin{bmatrix} s_1 \\ s_2 \end{bmatrix} = \begin{bmatrix} 1 & 0 & 0 \\ x & 0 & 0 \\ 0 & 1 & 0 \\ 0 & 0 & x \end{bmatrix} \begin{bmatrix} s_1 \\ s_2 \end{bmatrix}.$$

In this representation, the precoding submatrix P which contains all the precoding information for all antennas and both transport block is contained in a single block diagonal matrix. Assuming the original transmission has a power of 1 on each of its four antennas, then the total power of transmission is 4. Using only smaller subset of transmit antennas for a precoded transmission at the mobile, usually carries a corresponding power penalty. As an example, using only two out of four antennas may lead to total power loss of approximately −3 dB in the uplink transmission.

If a retransmission needs to be performed for only one of the transport blocks, a mobile needs information or new indication from the base station of the corresponding "downsized" precoding matrix, i.e., for the reduced number of spatial layers. However, there is no additional signaling from the base station according to HARQ retransmission protocol. For example, in LTE uplink there are both adaptive and non-adaptive retransmissions supported. In adaptive retransmission, additional parameters for the retransmission are indicated explicitly, which include a retransmission precoding matrix. For non-adaptive retransmission, a eNB simply indicates whether a retransmission is to be performed, for example by an ACK and NACK indication, which requires much less overhead on the downlink channel. In LTE, PHICH (Physical HARQ Indicator Channel) can be efficiently used for this purpose.

Any indication of new parameters represents additional signaling overhead on the downlink. It is preferable to pre-define a fixed precoding for the mobile unit precoding in this case. There are multiple ways to define such a precoder for retransmission. A simple way is to define a default precoder for each case. For example, if we use $M_r$, $L_r$ to represent number of subset antennas and the layers associated with the transport block to be retransmitted, then for given parameters $M_1, M_2, L_1, L_2$ a two fixed precoding matrices for retransmission can be defined depending on which TB is successful. A better approach could be to define retransmission precoding matrix based on the precoder P used in the original transmission. We will discuss some exemplary embodiments for this more general case targeting good performance for the retransmission and also to achieve full power utilization by performing retransmission on most or all of the transmit antennas. In the illustrated cases, we will assume the first TB is always successful and the second TB is to be retransmitted. Without loss of generality, this is simply for notational convenience and the embodiments apply to the order reversed (with first TB to be retransmitted) and the corresponding reversal of the described precoding matrices, submatrices, antennas, layers etc.

In one example, the retransmitted second transport block is simply transmitted using the precoding sub-matrix associated with the same transport block in the original transmission on the same subset of antennas. The transmission would look like, $$x = \begin{bmatrix} x_1 \\ x_2 \end{bmatrix} = \begin{bmatrix} 0 & 0 & 0 \\ 0 & 0 & 0 \\ 0 & 1 & 0 \\ 0 & 0 & 1 \end{bmatrix} \begin{bmatrix} 0 \\ s_2 \end{bmatrix}$$

This is a simpler way to define retransmission precoder by the corresponding precoding submatrix. However, it only uses a subset of two antennas out of all the four available antennas for retransmission and correspondingly suffers a power penalty proportional to number of antennas, which is a factor of 2 here.

In one embodiment, where the second transport block has at least two layers as in the example above, the retransmission of the second TB is to transmit the first layer of the second transport block with the precoding sub-matrix used for the first transport block. A second layer of the second transport block is transmitted using one of the columns of the precoding submatrix used for the second transport block. Therefore with the precoding submatrices defined above, first layer of the second transport block could be retransmitted on the first antenna set with the signal $$x_1 = \begin{bmatrix} 1 \\ x \end{bmatrix} s_2 \quad (1)$$

and second layer of the second transport block on the second set $$x_2 = \begin{bmatrix} 1 \\ 0 \end{bmatrix} s_2. \quad (2)$$

The overall retransmission precoding would be $$x = \begin{bmatrix} 1 & 0 & 0 \\ x & 0 & 0 \\ 0 & 1 & 0 \\ 0 & 0 & 0 \end{bmatrix} \begin{bmatrix} s_2 \\ 0 \end{bmatrix}$$

where $s2=[s_2(1)\ s_2(2)]T$ is a length two vector corresponding to two layers. Note that the total power is now 3 instead of 2, since only one of the second set of antennas is used. The quantities $s_2(1)$ and $s_2(2)$ are the symbols to be transmitted on one subcarrier on layers 0 and 1 respectively. Note that the retransmission of a first layer of the second data transport block is from the first set of antennas according to the first precoding submatrix, and a second layer of the second data transport block from a subset of the second set of antennas (one in the above example) according to a subset of columns of the second precoding submatrix (one column of the second precoding submatrix in the above example).

In a second embodiment, the first precoding submatrix is reused to transmit both layers of the retransmitted second transport block. In the example above the two sets of antenna outputs would then be $$x_1 = \begin{bmatrix} 1 \\ x \end{bmatrix} s_2 \quad (1)$$

and $$x_2 = \begin{bmatrix} 1 \\ x \end{bmatrix} s_2. \quad (2)$$

The overall precoding would be $$x = \begin{bmatrix} 1 & 0 & 0 \\ x & 0 & 0 \\ 0 & 1 & 0 \\ 0 & x & 0 \end{bmatrix} \begin{bmatrix} s_2 \\ 0 \end{bmatrix}$$

Note that in this case the total transmitted power is 4, i.e., from all antennas. In this example, the retransmission of a first layer of the second data transport block is from the first set of antennas according to the first precoding submatrix, and a second layer of the second data transport block from the second set of antennas is also according to the first precoding submatrix. Note that we can multiple the first precoding submatrix by a scalar without changing the effective retransmission precoding matrix.

In a variation of the above embodiment, the second layer of the second data transport block can be sent from the second set of antennas according to another known precoding submatrix different from the first precoding submatrix. This may be desirable in some cases, if the retransmission matrix defined by the above embodiments is not a valid codebook entry in the rank-r codebook defined for original transmissions, where r is the total number of layers in the second transport block. Such known precoding submatrix may be defined by a rule. The rule could be to find one or more rank-r precoding matrice in the rank-r codebook that have the same first precoding submatrix defined for original transmission. If more than one such matrix exists, an arbitrary rank-r precoding matrix can be selected and pre-defined from the one or more rank-r precoding matrices. Or the selection could be based on some relationship of the second submatrix of the rank-r precoding matrix to the first precoding submatrix for original transmission. One relationship could be selecting based on a vector difference norm or vector correlation or similar metric.

In the above embodiments, at least one column of the precoding submatrix corresponding to the successfully decoded transport block is reused to construct the retransmission precoder.

Let us consider another example as follows, with the first transport block transmitted with two-layer transmission and the second transport block with one-layer transmission. $s_1$ is a length-2 vector and $s_2$ is a length-1 vector. Let us again assume the case where the first transport block is successful and the second transport block is to be retransmitted.

$$x = \begin{bmatrix} x_1 \\ x_2 \end{bmatrix} = P \begin{bmatrix} s_1 \\ s_2 \end{bmatrix} = \begin{bmatrix} 1 & 0 & 0 \\ 0 & 1 & 0 \\ 0 & 0 & 1 \\ 0 & 0 & x \end{bmatrix} \begin{bmatrix} s_1 \\ s_2 \end{bmatrix}$$

The second transport to be retransmitted with only a single layer transmission, but the transmission can be performed on the total of four antennas by using the same precoding submatrix $[1\ x]T$ used on the second subset of antennas, i.e., $$x_1 = \begin{bmatrix} 1 \\ x \end{bmatrix} s_2 \tag{1}$$

and $$x_2 = \begin{bmatrix} 1 \\ x \end{bmatrix} s_2. \tag{1}$$

The overall precoder is $$x = \begin{bmatrix} x_1 \\ x_2 \end{bmatrix} = P_r \begin{bmatrix} s_1 \\ s_2 \end{bmatrix} = \begin{bmatrix} 0 & 0 & 1 \\ 0 & 0 & x \\ 0 & 0 & 1 \\ 0 & 0 & x \end{bmatrix} \begin{bmatrix} 0 \\ s_2 \end{bmatrix}$$

Note that the retransmission of the second data transport block is from the first set of transmit antennas according to the second precoding submatrix, and also from the second set of transmit antennas according to the second precoding submatrix. A more generic formulation is multiplication by scalars of the corresponding precoding submatrices in the retransmission precoding matrix.

$$x = \begin{bmatrix} x_1 \\ x_2 \end{bmatrix} = P_r \begin{bmatrix} s_1 \\ s_2 \end{bmatrix} = \begin{bmatrix} 0 & 0 & c_1 \\ 0 & 0 & c_1 x \\ 0 & 0 & c_2 1 \\ 0 & 0 & c_2 x \end{bmatrix} \begin{bmatrix} 0 \\ s_2 \end{bmatrix}$$

where the scalars c1, c2 may be equal to each other. This general formulation can apply to all the embodiments described herein.

We also note that we have denoted the Pr in the previous embodiment as $$P_r = \begin{bmatrix} 0 & 0 & 1 \\ 0 & 0 & x \\ 0 & 0 & 1 \\ 0 & 0 & x \end{bmatrix}$$

which is equivalent to the representation $$P_r = \begin{bmatrix} 1 \\ x \\ 1 \\ x \end{bmatrix}$$

This representation is used herein to illustrate the relationship to the original precoder and both are considered equivalent, with the second compressed representation being understood as the sufficient description.

The above embodiments can also be described in the alternate notation described above as $$x = \begin{bmatrix} x_1 \\ x_2 \end{bmatrix} = P_r s_2$$

where all precoding information for the retransmission is contained in a matrix $P_r$ which has a block diagonal structure or a concatenation of two matrices in the row dimension.

$$P_r = \begin{bmatrix} P_{1r} & 0 \\ 0 & P_{2r} \end{bmatrix}$$

$$\text{or } P_r = \begin{bmatrix} P_{1r} \\ P_{2r} \end{bmatrix}$$

where $P_{1r}$ and $P_{2r}$ are based on the first and second precoding submatrices P1 and P2. As explained in the previous embodiments, one of the key elements of such construction is to reuse the two-antenna precoding submatrix $[1\ x]T$ in the first precoder. This vector $[1\ x]T$ represents the optimal way to combine (or co-phase) signals on two antennas and achieves coherent combining gain.

In another embodiment of the invention, the mobile station uses not only the first and second precoding submatrices and the information in the HARQ-ACK control message on the success or failure of the decoding of the transport blocks, but also additional parameters signaled in the grant message. These may include the transport block size, the number of layers, the modulation used for both transport blocks, and the number of subcarriers in the allocation. These parameters may be combined to calculate a layer spectral efficiency for a set of possible retransmission precoding matrices including the embodiments listed above. The precoding matrix with the highest retransmission spectral efficiency is then used for the retransmission. Other figures of merit may be used such as effective code and total transmit power.

In another embodiment, a retransmission precoder can be signalled as part of the precoding indication in the grant on the control channel. In other words, the original control message comprises of not only the precoder matrix to be used in the first transmission, but also the retransmission precoder matrix in the subsequent transmission if one TB needs a retransmission. To achieve that, additional signaling overhead may incur, but it can be kept to a minimal level and sometimes even without incurring any overhead over existing signaling. For example, additional retransmission precoder matrices may be included in a codebook that has unused index. One example is the case of a codebook that has 24 rank-1 precoders, 16 rank-2 precoders, 12 rank-3 entries precoders, and one rank-4 precoder for a total of 53 matrices as currently defined for LTE release-10 uplink precoding. The 6-bit precoding indication field will correspond to one of 64 entries. The retransmission precoder can be signalled with the following additional entries as shown in the last two rows.

| Field Entries | Precoder | Retransmission Precoder |
|---|---|---|
| 0-23 | Rank 1 precoders 0-23 | N/A |
| 24-39 | Rank 2 precoders 0-15 | N/A |
| 40-51 | Rank 3 precoders 0-15 | N/A |
| 52 | Rank 4 identity | Rank 2 Retransmission Precoder 0 |
| 53 | Rank 4 identity | Rank 2 Retransmission Precoder 1 |

PMI #52 and #53 indicates an identity matrix is currently defined for rank-4 precoder, and if a subsequent retransmission is need a predefined retransmission precoder corresponding to PMI #52 and #53 can be used, respectively.

In another preferred embodiment, a communicationd device receives information of a precoding matrix from a base station for use in the transmission of a first data transport block and a second data transport block, and also information of a retransmission precoding matrix for use in the retransmission of a data transport block. After transmitting a first data transport block a second data transport block according to the precoding matrix, it receives from the base station information on the success or failure of the decoding of the first transport block and the second transport block. It then retransmits the second data transport block according to the retransmission precoding matrix, when the received information indicates the retransmission request of the second transport block. The precoder matrix and the retransmission precoder matrix may be included in a single control message and jointly encoded as described in the previous embodiment. The jointly encoding refers to the method where a code-point represented by a single bit-field indicates both the precoder matrix and the retransmission matrix.

In general the precoder indication is jointly coded to gives indications of two precoders, one for the granted transmission, and another one for retransmission. It is not necessary for all precoder indications to give a retransmission precoder. As described earlier, a good choice of a retransmission precoder may be constructed from the precoding matrix indicated in the original grant message. In the above example, the original precoder matrix (i.e., identity matrix) may not very useful for deriving the retransmission precoder. Hence supplemental retransmission precoders are defined to take advantage of unused index. The precoding indication field in the control channel grant message can be represented as an integer, $i_{pmi}$, in the set of integers $I_{PMI}$. The precoder to be used on the granted transmission is specified by the function $f_{grant}$(pmi) with domain $I_{PMI}$ and range is the original transmission precoding codebook precoding. A second function $g_{retrans}$(pmi) maps a subset of $I_{PMI}$ to a retransmission codebook. The mapping can also be made a function of other parameters in the grant message such as TB size, allocated subcarriers, as well information on the status of decoding of the transport blocks in the HARQ-ACK message.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for a wireless communication device to retransmit a data transport block to a base station, the method comprising:
receiving, at the wireless communication device, information of a precoding matrix from the base station wherein the precoding matrix comprises of a first precoding submatrix and a second precoding submatrix; transmitting a first data transport block from a first set of at least two antennas of the wireless communication device according to the first precoding submatrix and a second data transport block from a second set of at least two antennas of the wireless communication device according to the second precoding submatrix;
receiving at the wireless communication device from the base station a retransmission request for the second data transport block;
retransmitting from the wireless communication device to the base station the second data transport block according to a retransmission precoding matrix from at least one antenna of the first set of antennas and at least one antenna of the second set of antennas in response to the retransmission request, and retransmitting a first layer of the second data transport block from the first set of antennas according to the first precoding submatrix.

2. The method of claim 1, wherein the precoding matrix is a block diagonal matrix comprised of the first precoding submatrix and the second precoding submatrix.

3. The method of claim 2 wherein the first precoding submatrix has one column and the second precoding submatrix has at least two columns.

4. The method of claim 1 wherein the retransmission precoding matrix is a block diagonal matrix.

5. The method of claim 1 wherein the retransmission precoding matrix is a vector.

6. The method of claim 1 wherein the first set of antennas and the second set of antennas are non-overlapping.

7. The method of claim 1 wherein retransmitting the second data transport block includes retransmitting a second layer of the second data transport block from a subset of the second set of antennas according to a subset of columns of the second precoding submatrix.

8. The method of claim 1 wherein retransmitting the second data transport block includes retransmitting a second layer of the second data transport block from the second set of antennas according to the first precoding submatrix.

9. The method of claim 1 wherein retransmitting the second data transport block includes retransmitting a second layer of the second data transport block from the second set of antennas according to the first precoding submatrix multiplied by a scalar.

10. The method of claim 7, wherein retransmitting the second data transport block includes retransmitting a second layer of the second data transport block from the second set of antennas according to another known precoding submatrix different from the first precoding submatrix.

11. The method of claim 1 wherein retransmitting the second data transport block includes retransmitting the second data transport block from the first set of transmit antennas according to the second precoding submatrix and from the second set of transmit antennas according to the second precoding submatrix.

\* \* \* \* \*